United States Patent
Spitzer et al.

[19]

[11] Patent Number: 6,023,372
[45] Date of Patent: *Feb. 8, 2000

[54] LIGHT WEIGHT, COMPACT REMOUNTABLE ELECTRONIC DISPLAY DEVICE FOR EYEGLASSES OR OTHER HEAD-BORNE EYEWEAR FRAMES

[75] Inventors: Mark B. Spitzer, Sharon; Mark H. Olson, Cambridge, both of Mass.

[73] Assignee: The Microoptical Corporation, Boston, Mass.

[ * ] Notice: This patent is subject to a terminal disclaimer.

[21] Appl. No.: 09/170,887

[22] Filed: Oct. 14, 1998

Related U.S. Application Data

[60] Provisional application No. 60/064,430, Oct. 30, 1997.

[51] Int. Cl.[7] ............................. G02B 27/14; G09G 5/00
[52] U.S. Cl. ................................................ 359/630; 345/8
[58] Field of Search ................................. 351/111, 112, 351/158; 345/7, 8; 359/630, 631, 633, 638

[56] References Cited

U.S. PATENT DOCUMENTS

| Re. 28,847 | 6/1976 | Vizenor | 350/302 |
|---|---|---|---|
| D. 195,365 | 6/1963 | Holt | D57/1 |
| 3,192,826 | 7/1965 | Papke . | |
| 3,216,308 | 11/1965 | Northcutt | 88/1 |
| 3,229,580 | 1/1966 | Mitchell | 88/86 |
| 3,524,710 | 1/1967 | Rickert | 356/251 |
| 3,610,825 | 10/1971 | Fritzel | 178/7.8 |
| 3,787,109 | 1/1974 | Vizenor | 350/302 |
| 3,885,095 | 5/1975 | Wolfson et al. | 178/7.88 |
| 3,915,548 | 10/1975 | Opittek et al. | 350/3.5 |
| 3,923,370 | 12/1975 | Mostrom | 350/55 |
| 3,936,605 | 2/1976 | Upton | 179/1 SP |
| 3,940,204 | 2/1976 | Withrington | 350/3.5 |

(List continued on next page.)

FOREIGN PATENT DOCUMENTS

| 22 05 325 C2 | 4/1973 | Germany | 356/251 |
|---|---|---|---|
| 301672 | 12/1928 | United Kingdom | 350/286 |

OTHER PUBLICATIONS

"The Wearable PC, Wired for Wear: IBM Researchers-Demonstrate a Wearable Think Pad Prototype", www.ibm-.com/News/Is/1998/09/jp–3.phtml, Sep. 1998.

"Technical Prototype, See the Specifications for IBM's New Wearable PC Prototype", www.ibm.com/News/Is/1998/09/jp–4.phtml, Sep. 1998.

Albacomp Computers Corp. "Personal Monitor" Brochure, 1998.

Ferrin, Frank J., "An update on optical systems for military head mounted displays", presented at SPIE's "AeroSense", Apr. 5–9, 1999, 8 pages.

Rotier, Donald J., "Optical Approaches to the Helmet Mounted Display", SPIE vol. 1116 Helmet–Mounted Displays (1989), pp. 14–18.

*Primary Examiner*—Georgia Epps
*Assistant Examiner*—David N. Spector
*Attorney, Agent, or Firm*—Weingarten, Schurgin, Gagnebin & Hayes LLP

[57] ABSTRACT

The present invention provides a compact, remountable display device for attachment to eyewear having a head-borne frame to provide an image from an image display superposed on the ambient image. The display device includes a housing assembly which removably mounts to the head-borne frame at a location outside of a user's field of view. An electronic imaging assembly is supported by the housing assembly outside of the user's field of view and in communication with circuitry within the housing assembly to produce an image. An optical element is provided comprising a transparent fixture supporting an eyepiece assembly in front of a user's eye. The transparent fixture is located to receive the image from the electronic imaging assembly and relays the image to the eyepiece assembly, which directs the image to the user's eye. The display device is a light weight, compact, ergonomic, remountable display system that combines an image relay system and mechanical support with a simple mounting system that can be applied to eyeglasses or other head gear. The display device does not significantly obscure the field of view of the user, does not hide the user's face, and provides an undistorted image.

37 Claims, 6 Drawing Sheets

U.S. PATENT DOCUMENTS

| | | | |
|---|---|---|---|
| 4,052,073 | 10/1977 | Miller | 273/148 R |
| 4,082,432 | 4/1978 | Kirschner | 350/174 |
| 4,195,915 | 4/1980 | Lichty et al. | 350/345 |
| 4,218,111 | 8/1980 | Withrington | 350/3.72 |
| 4,447,128 | 5/1984 | Ferrer | 350/174 |
| 4,550,984 | 11/1985 | Reymond | 350/404 |
| 4,664,475 | 5/1987 | Ferrer | 350/174 |
| 4,665,385 | 5/1987 | Henderson | 340/539 |
| 4,722,601 | 2/1988 | McFarlane | 356/152 |
| 4,751,691 | 6/1988 | Perera | 368/10 |
| 4,753,514 | 6/1988 | Kubik | 350/174 |
| 4,799,765 | 1/1989 | Ferrer | 350/174 |
| 4,806,001 | 2/1989 | Okabe et al. | 350/432 |
| 4,806,011 | 2/1989 | Bettinger | 351/158 |
| 4,818,048 | 4/1989 | Moss | 350/3.7 |
| 4,826,287 | 5/1989 | Cook et al. | 350/174 |
| 4,852,988 | 8/1989 | Velez et al. | 351/210 |
| 4,853,306 | 8/1989 | Wreede et al. | 430/1 |
| 4,867,551 | 9/1989 | Perera | 351/158 |
| 4,869,575 | 9/1989 | Kubik | 350/174 |
| 4,968,117 | 11/1990 | Chern et al. | 350/162.24 |
| 4,973,132 | 11/1990 | McDonald et al. | 350/174 |
| 4,973,139 | 11/1990 | Weinhrauch et al. | 350/345 |
| 5,003,300 | 3/1991 | Wells | 340/705 |
| 5,013,134 | 5/1991 | Smith | 350/174 |
| 5,028,119 | 7/1991 | Hegg et al. | 350/174 |
| 5,044,709 | 9/1991 | Smith et al. | 359/13 |
| 5,050,962 | 9/1991 | Monnier et al. | 359/13 |
| 5,053,755 | 10/1991 | Smith et al. | 340/705 |
| 5,129,716 | 7/1992 | Holakovszky et al. | 351/50 |
| 5,138,470 | 8/1992 | Moss et al. | 359/13 |
| 5,162,828 | 11/1992 | Furness et al. | 353/122 |
| 5,212,471 | 5/1993 | McDonald | 340/705 |
| 5,214,425 | 5/1993 | Wreede | 340/980 |
| 5,231,379 | 7/1993 | Wood et al. | 340/705 |
| 5,281,957 | 1/1994 | Schoolman | 345/8 |
| 5,281,960 | 1/1994 | Dwyer, III | 345/31 |
| 5,309,169 | 5/1994 | Lippert | 345/8 |
| 5,320,538 | 6/1994 | Baum | 434/307 |
| 5,325,386 | 6/1994 | Jewell et al. | 372/50 |
| 5,334,991 | 8/1994 | Wells et al. | 345/8 |
| 5,348,477 | 9/1994 | Welch et al. | 434/43 |
| 5,359,669 | 10/1994 | Shanley et al. | 382/6 |
| 5,367,345 | 11/1994 | daSilva | 351/123 |
| 5,369,415 | 11/1994 | Richard et al. | 345/6 |
| 5,381,267 | 1/1995 | Woody | 359/632 |
| 5,384,654 | 1/1995 | Iba | 359/364 |
| 5,392,158 | 2/1995 | Tosaki | 359/633 |
| 5,416,876 | 5/1995 | Ansley et al. | 385/116 |
| 5,455,591 | 10/1995 | Hui | 342/185 |
| 5,459,612 | 10/1995 | Ingleton | 359/630 |
| 5,469,185 | 11/1995 | Lebby et al. | 345/8 |
| 5,491,510 | 2/1996 | Gove | 348/77 |
| 5,506,728 | 4/1996 | Edwards et al. | 359/629 |
| 5,519,410 | 5/1996 | Smalanskas et al. | 345/7 |
| 5,537,253 | 7/1996 | Cox et al. | 359/630 |
| 5,539,578 | 7/1996 | Togino et al. | 359/630 |
| 5,579,148 | 11/1996 | Nishikawa et al. | 359/214 |
| 5,583,590 | 12/1996 | Clupper | 351/200 |
| 5,585,871 | 12/1996 | Linden | 351/158 |
| 5,589,846 | 12/1996 | Kobayashi | 345/8 |
| 5,596,451 | 1/1997 | Handschy et al. | 359/633 |
| 5,606,743 | 2/1997 | Vogt et al. | 455/347 |
| 5,610,765 | 3/1997 | Colucci | 359/633 |
| 5,629,790 | 5/1997 | Neukermans et al. | 359/198 |
| 5,648,789 | 7/1997 | Beadles et al. | 345/8 |
| 5,654,827 | 8/1997 | Reichert | 359/631 |
| 5,654,828 | 8/1997 | Togino et al. | 359/633 |
| 5,671,037 | 9/1997 | Ogasawara et al. | 351/158 |
| 5,673,139 | 9/1997 | Johnson | 359/291 |
| 5,682,173 | 10/1997 | Holakovszky et al. | 345/8 |
| 5,712,649 | 1/1998 | Tosaki | 345/8 |
| 5,717,479 | 2/1998 | Rickards | 351/158 |
| 5,719,588 | 2/1998 | Johnson | 345/8 |
| 5,744,788 | 4/1998 | Metlitsky et al. | 235/454 |
| 5,751,493 | 5/1998 | Hur | 359/630 |
| 5,886,822 | 3/1999 | Spitzer | 359/630 |

LIGHT WEIGHT, COMPACT REMOUNTABLE ELECTRONIC DISPLAY DEVICE FOR EYEGLASSES OR OTHER HEAD-BORNE EYEWEAR FRAMES

CROSS REFERENCE TO RELATED APPLICATIONS

This application claims the benefit under 35 U.S.C. § 119(e) of U.S. Provisional Application Ser. No. 60/064,430, filed Oct. 30, 1997, entitled Eyeglass Interface System, the disclosure of which is incorporated by reference herein.

STATEMENT REGARDING FEDERALLY SPONSORED RESEARCH OR DEVELOPMENT

N/A

BACKGROUND OF THE INVENTION

There are many examples of displays mounted on the head, sunglasses, eyeglasses and the like. For example, Perera in U.S. Pat. No. 4,867,551 describes a display to be mounted on eyeglasses, the limitation of which is the high degree of occlusion of the user's field of view beyond the display, and the use of non-axial optics which introduces distortion. A high degree of occlusion is also present in an eyeglass mounted display offered for sale by Albacomp Computers Corp. Other companies, such as Liquid Image or Virtual Vision, provide displays that are suspended by a cable, gooseneck fixture or other mechanical support in front of one or both of the user's eyes. Similarly, displays from Reflection Technology have been mounted on eyewear in order to provide a computer display in a mobile fashion. This approach also highly limits the user's view of the surroundings.

Not only do such prior art displays obscure a large part of the user's visual field, but also the display obscures the user's face. The obscuration of the visual field is a limitation particularly in applications in which the user must be free to focus on the work at hand, without diverting attention to the display.

Generally, head-mounted and helmet-mounted display systems are based on miniature displays having a diagonal dimension of 4 cm or less. The display systems that use such miniature displays must provide a lens near the eye for magnification, and to make possible comfortable viewing at near distances. The lens and any other associated optics that must be placed near the eye are termed the "eyepiece." Most prior art head-mounted systems also place the display (for example a miniature liquid crystal flat panel display) near the eye as well, which requires both a support fixture for the eyepiece, and a conduit for electrical cables to the display. These components (wires, liquid crystal display, and any other required circuits) are placed within an opaque housing near the eye. Consequently, such systems block a portion of the user's visual field, and also obscure the user's face. Obscuration of the face reduces the desirability of using the device in social occasions.

A helmet-mounted display is also known in which the image is provided by a glass fixture suspended in front of the user's face. The glass fixture is mounted to the helmet and contains an eyepiece near the eye. The glass fixture serves as a mechanical support for the eyepiece as well as an image conduit for the display which is mounted to the helmet. The limitation of this system, however, is its size and weight, and its configuration as a helmet.

SUMMARY OF THE INVENTION

The present invention provides a compact, remountable display device for attachment to eyewear having a head-borne frame. The display device comprises a housing assembly having a mounting mechanism disposed to removably mount to the head-borne frame of the eyewear at a location outside of a user's field of view. Circuitry is disposed within the housing assembly to receive data or video signals. An electronic imaging assembly is supported by the housing assembly outside of the user's field of view and in communication with the circuitry within the housing assembly to produce an image. The display device also includes an optical element which comprises a transparent fixture for supporting an eyepiece assembly in front of a user's eye. The transparent fixture is located to receive the image from the electronic imaging assembly and is capable of relaying the image internally to the eyepiece assembly. The eyepiece assembly is supported by the transparent fixture to direct an image to the user's eye.

This invention provides a new approach to a light weight, compact, ergonomic, remountable display system that combines an image relay system and mechanical support with a simple mounting system that can be applied to eyeglasses or other head gear. The display device provides several improvements on the prior art, including the use of a miniature flat panel display mounted near the glasses combined with a transparent optomechanical fixture that suspends the eyepiece near the eye. The display device can be mounted to eyeglasses or other head gear, does not significantly obscure the field of view of the user, does not hide the user's face, and provides a largely undistorted image of the displayed image as well as of the ambient scene. Similarly, the view of the user's eye to another observer is largely undistorted as well. The display device is able to provide an image in a see-through manner, so that the user sees a superposition of the image from the display and the ambient image.

This invention provides many of the same functions and advantages as the image combining system described in patent application Ser. No. 08/844,098, filed on Apr. 18, 1997, entitled "Image Combining System for Eyeglasses and Face Masks," the disclosure of which is incorporated by reference herein. The invention has the additional advantage that it can be fit to a wide range of users without prescriptive correction or other customization.

The display device can be made adjustable to allow the user to position the image in a convenient location in the user's field of view. The device can be added to or removed from eye glasses with little discomfort to the user. The device may include a clamping mechanism to attach to the temple of a pair of eyeglass frames. In an alternative embodiment, the device may clip to a lower or upper edge of the frame around the lens. The device may also include a hinge or link element to allow the optical element to be moved away from the user's field of view without removing the device from the eyeglass frames. Two display devices may also be used to provide a binocular display.

DESCRIPTION OF THE DRAWINGS

The invention will be more fully understood from the following detailed description taken in conjunction with the accompanying drawings in which.

DETAILED DESCRIPTION OF THE INVENTION

Figure 1:
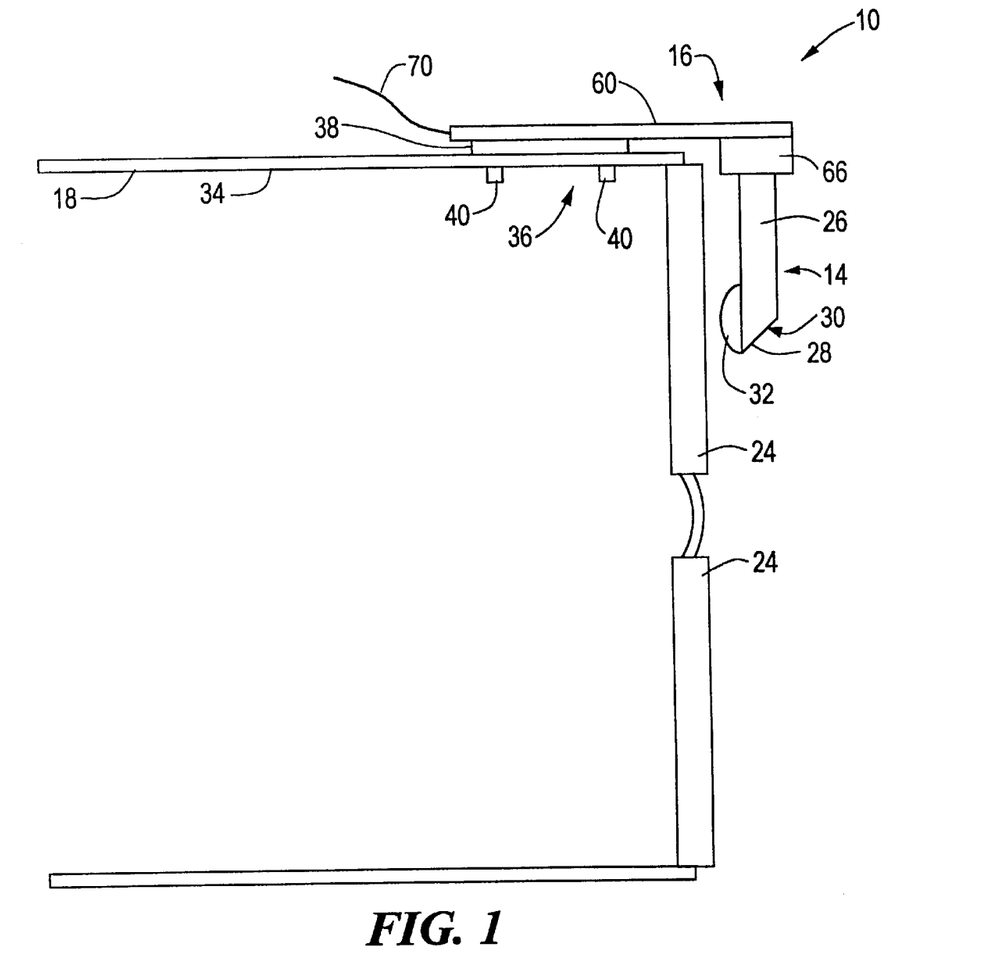
FIG. 1 is a plan view of a display device mounted to a pair of eyeglass frames according the present invention.

A display device according to the present invention is illustrated generally in FIG. 1. The display device 10 comprises an imaging assembly 12 (see FIGS. 4–6), an optical element 14, and a housing assembly 16 which is removably mountable to eyeglass frames 18.

Referring to FIGS. 1–6, the housing assembly 16 includes an enclosure 20 for containing circuitry 22 for receiving data or images relayed to the display device 10 and for containing the imaging assembly. The circuitry may include integrated or discrete circuits which are connected to the imaging assembly. Light from the imaging assembly is relayed via the optical element 14 through the eyeglass lens 24 to the user's eye. The optical element 14 comprises a transparent fixture or relay 26 and an eyepiece assembly 28 which, in the embodiment shown in FIGS. 1 through 3, comprises a mirror 30 and lens 32. The housing assembly 16 is mounted to the temple 34 of the user's glasses 18 by a clamping assembly 36 illustrated by a mounting fixture 38 and clamps 40. The relay 26 and eyepiece assembly 28 are positioned in front of the user's eyeglass lens 24 so that the image is viewed through the eye lens 32 which is positioned by the user in a convenient location for viewing. The housing assembly is located substantially outside the user's field of view, which means that the housing assembly does not block the user's main field of view. For corrective lenses, the main field of view is defined by the view through the lens. For non-corrective lenses such as safety glasses, the main field of view is defined by the area bounded by about 45o to the sides of a line looking ahead and about 20o above and below the line the looking ahead.

Figure 4:
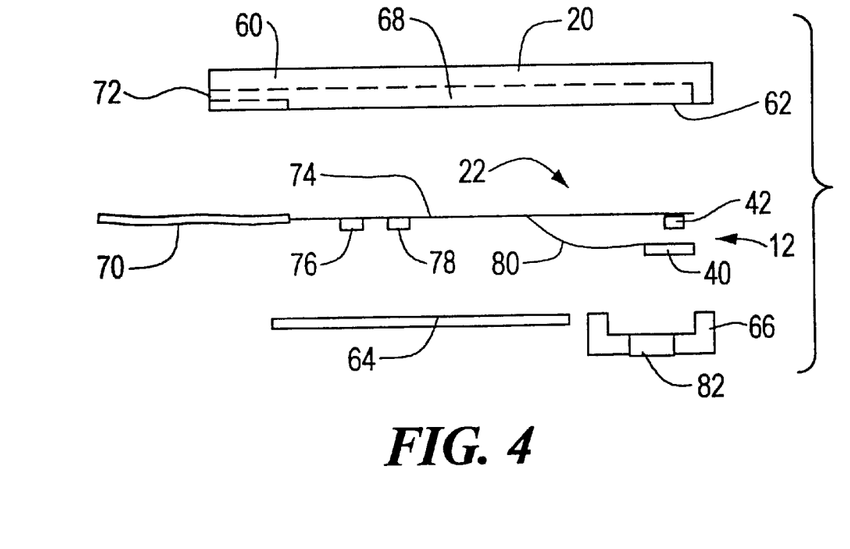
FIG. 4 is an exploded view of a housing assembly of the display device of FIG. 1.
Figure 5:
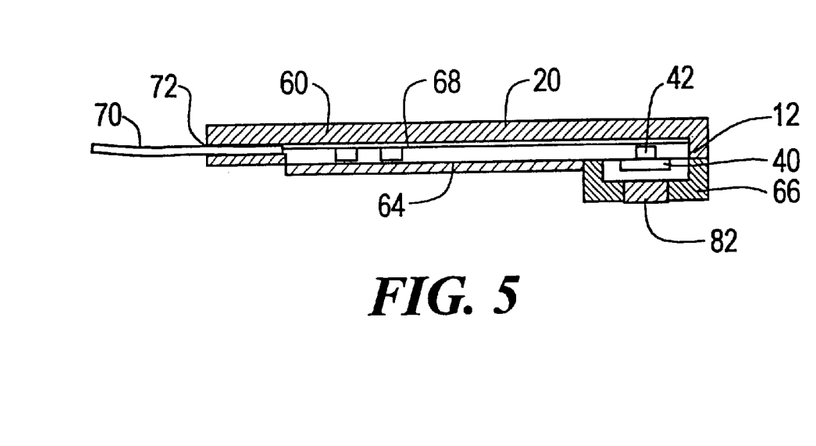
FIG. 5 is a cross-sectional view of the housing assembly of FIG. 4.
Figure 6:
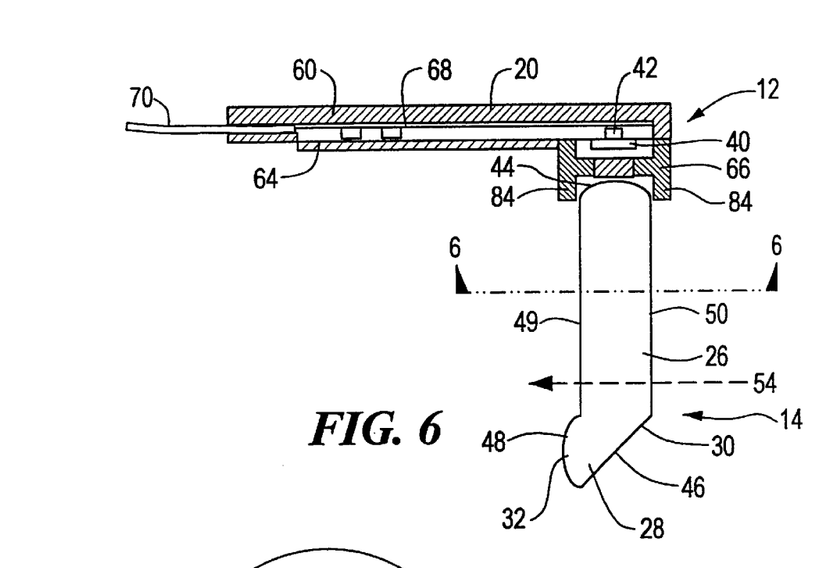
FIG. 6 is a cross-sectional view of the display device of FIG. 1.

The imaging assembly 12 may comprise a transmissive or reflective miniature active matrix liquid crystal display (AMLCD), an electroluminescent display, or any other miniature flat panel display having a screen diagonal of less than 2 cm. For example, the Kopin Cyber Display P/N KCD-QMO2-AA is suitable. Additionally, the imaging component may comprise a scanning display as described in U.S. Pat. No. 5,715,337 or any number of other imaging elements formed from liquid crystals, light emitting diodes, electroluminescent materials or field emissions displays. In FIGS. 4 through 6, an AMLCD image generator 40 with a backlight 42 is shown. The backlight may be made from any number of illuminators such as light emitting diodes, incandescent lamps, lasers, or other light emitting devices. For a reflective AMLCD, the backlight is repositioned as a front light by methods known in the art.

Figure 6A:
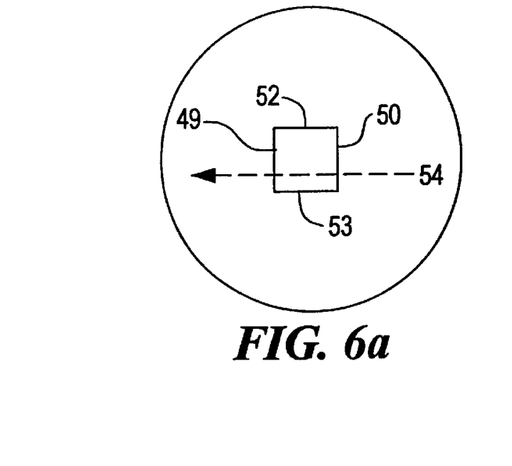
FIG. 6A is a cross-sectional view taken along line 6—6 of FIG. 6.

The optical element 14 preferably comprises five optical surfaces 44, 46, 48, 49, and 50 (FIG. 6). The optical element 14 is preferably rectangular in cross section, as shown in FIG. 6A. The surfaces 52 and 53 may optionally also be of optical quality, or may be frosted or blackened, and may or may not be optically parallel. Preferably, sections of the optical relay 26 within the user's main field of view are optically clear and of uniform index of refraction. The surfaces 49 and 50 are polished and optically parallel so that ray 54 representing a ray from the ambient scene traverses the relay with little or no change in propagation angle.

Surface 44, which may optionally be formed by a lens 45, receives rays created by the imaging assembly. The rays propagate through the relay 26 to the surface 46, which comprises a mirror 30 in the embodiment illustrated in FIGS. 1 through 6. The sides of the relay 26 are preferably parallel to minimize refraction and thus displacement in the image. The mirror 30 reflects the light toward the surface 48 of the lens 32. The lens 32 modifies the vergence of the rays from the imaging assembly 12 so that the image can be viewed with magnification and with the image formed at a comfortable distance between about 25 cm and infinity, depending on lens positions and focal lengths. The typical focal lengths of the lenses 45 and 32 are in the range of 20 to 100 mm. The lens surfaces 44 and 48 modify the vergence of the light from the imaging assembly to create a virtual image in front of the user at a distance of between 25 cm (close) and infinity. The distance of the virtual image may be set by selection of the focal length of the lens surfaces 44 and 48 and by adjustment of the distances between the lens surfaces 44 and 48 and the imaging assembly. Other folds using mirrors may be added to the optical path to relay the light on other optical paths if desired, or the light may be relayed by total internal reflections occurring along the sides of the relay 26.

Figure 2:
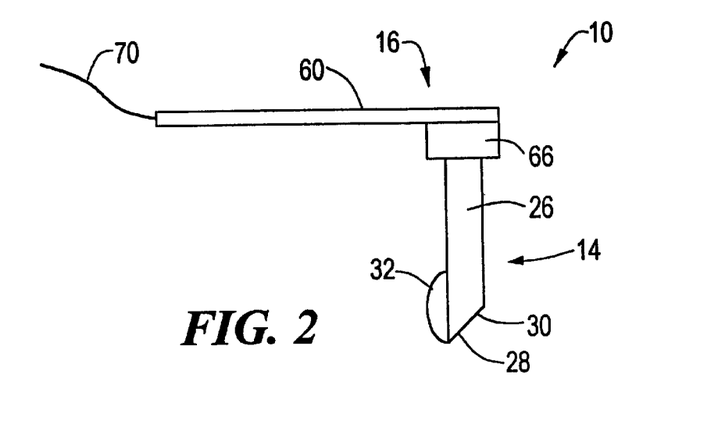
FIG. 2 is a plan view of the display device of FIG. 1.
Figure 3:
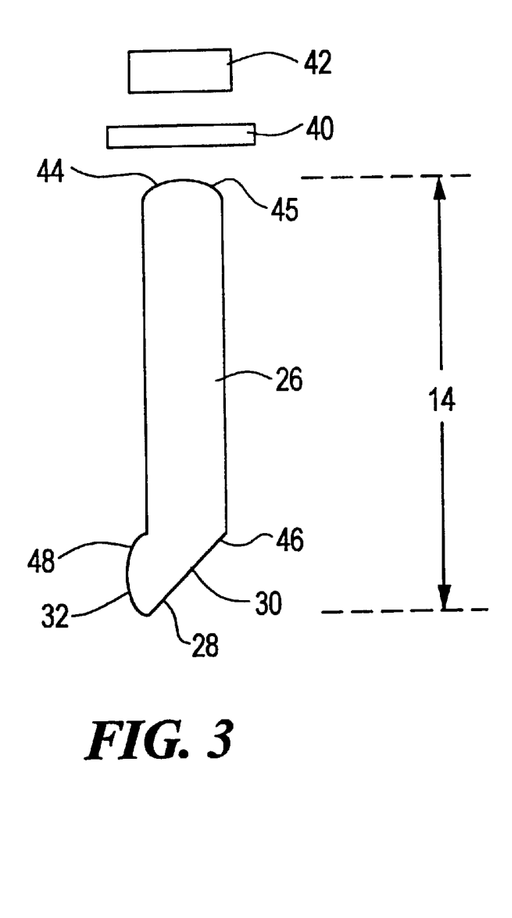
FIG. 3 is a plan view of an imaging assembly and optical element of the display device of FIG. 1.

The display device of the present invention utilizes largely transparent relay optics. FIGS. 1–3 illustrate in particular a "see-around" embodiment of the invention. The relay 26 serves both as a mechanism for transmitting the image to the eyepiece assembly, and also as a structural member for supporting the eyepiece assembly in the user's field of view. Since the relay 26 is transparent, the occlusion of the user's visual field is minimal or for certain designs, zero, and the obscuration of the user's face is minimal. Alternatively, a cover could be placed over or formed within the optical element to block ambient light from passing through the optical element if desired, for example, to reduce glint or other undesirable reflections. Additionally, if a hinge is provided within the unit, discussed further below, the optical element 14 can be swung out of the user's visual field when not in use, so that the obscuration can conveniently be eliminated. The invention thereby provides a miniature, clear, optical element 14 so that the user's vision is not significantly impeded by the presence of the display. Additionally, the present invention can be made very small, because the imaging assembly is located at the side of the user's eyeglasses, thereby minimizing the amount of structure in front of the user's eye.

Referring to FIGS. 4 through 6, the housing assembly 16 comprises a body 60, preferably having an open side 62 which is covered by one or more coverplates. In the embodiment shown, two coverplates 64, 66 are used. The components are mounted within a cavity 68 in the body. Data or images may be relayed to the device by a cable 70 which enters the body 60 through an aperture 72 at one end thereof. The cable may comprise wire, one or more optical fibers as described in U.S. Pat. No. 5,715,337, or a fiber optic coherent bundle image conduit. Alternatively, the data or images may be relayed to the device by radio frequency (RF) transmission.

The coverplates 64 and 66 are affixed to the body 66 in any known manner, such as with screws or adhesive, after insertion of the components. In the preferred embodiment, the components include a flexible circuit 74 made of Kapton or other material known in the art, upon which is provided metal conductors or traces which connect the various components, such as terminating resistors 76, 78 to input cable 70. The flexible circuit also connects the cable to one or more LEDs that form the backlight 42, and the second flexible circuit 80 that connects the system to the display 40. The display is visible through an opening 82 in the coverplate.

Referring to FIG. 6, the optical element 14 may be affixed to the coverplate 66 at a collar 84. The collar may be affixed to the coverplate in any known manner or may be formed integrally with the coverplate, such as by molding. The optical element 14 may be held in place by friction so that adjustments in focus may be made by the user, simply by moving the optical element 14 with respect to the imaging assembly, by sliding the optical element within the collar 84. A friction lock may be added to lock the optical element in a desired position relative to the imaging assembly, as would be known by those of skill in the art. Alternatively, the optical element may be fixed in place by adhesive, screws, or any other manner known in the art. In this case, the position of the optical element 14 in the collar is adjusted during assembly to provide the required distance between the optical surfaces of the optical element and the imaging assembly. Typically this distance is 10 to 15 mm, but it can be zero if the cavity between the imaging assembly and the entrance surface 44 of the optical element 14 is filled with index of refraction-matched epoxy.

Figure 15:
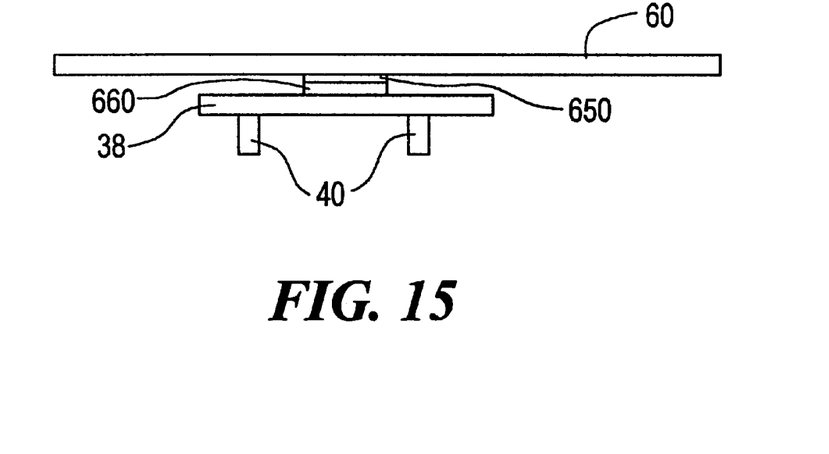
FIG. 15 is a plan view of a further embodiment having a rotatable adjustment mechanism.

The clamping assembly 36 may be affixed to the housing assembly in any suitable manner. For example, the mounting fixture 38 may be adhesively or otherwise fastened to the coverplate 64. The clamps 40 may be configured to allow the display device to be positioned at a variety of elevations with respect to the temple. In another variation, the body 60 may be attached to the mounting fixture 38 by a rotary joint formed by discs 650 and 660, as illustrated in FIG. 15. These discs rotate with respect to each other about a central pivot point and may have click stops built within to hold the device at various predefined angles with respect to the eyeglass temples, as would be known by those of skill in the art.

Figure 7:
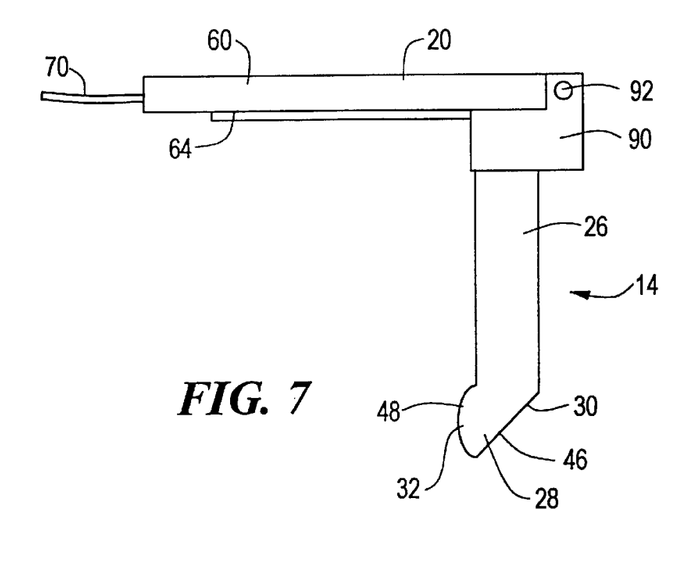
FIG. 7 is a plan view of a further embodiment of a display device using a swivel fixture.
Figure 8:
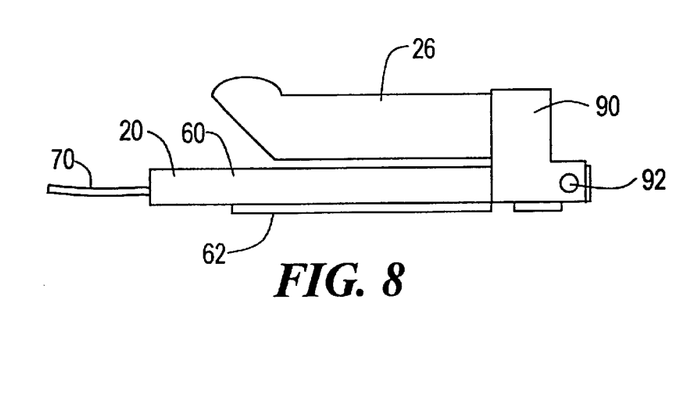
FIG. 8 is a plan view of the display device of FIG. 7.

In an alternative embodiment, the optical element 14 may be mounted on a swivel fixture 90 as shown in FIGS. 7 through 8. The swivel fixture 90 pivots around a pin 92 so that the device can fold up in a compact form for storage or convenience while remaining attached to the eyeglasses.

Figure 9:
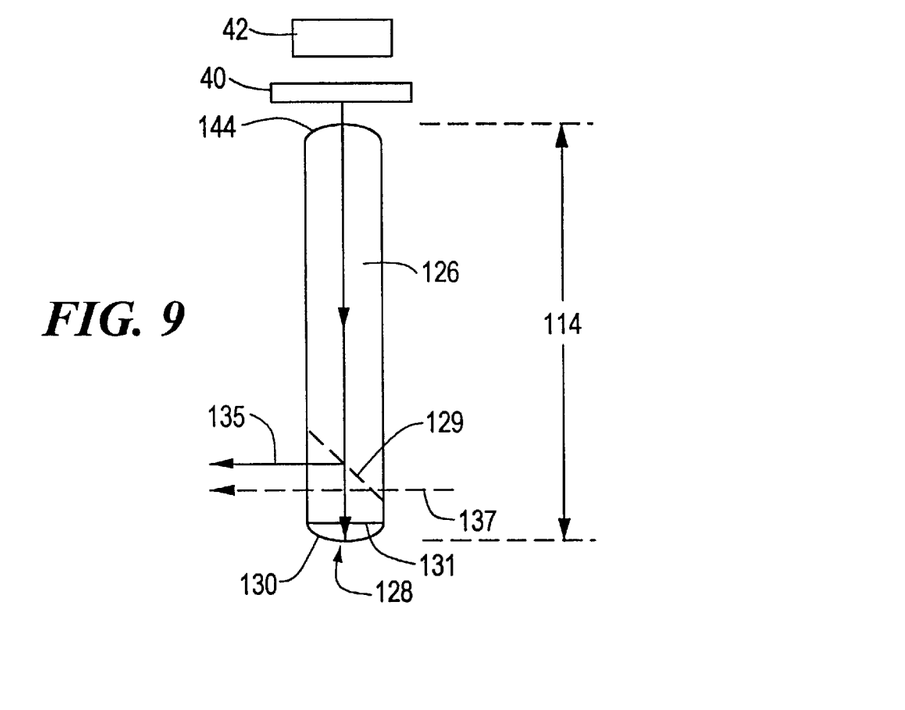
FIG. 9 is a plan view of a further embodiment of an optical element.

Another embodiment includes a non-occluded design of optical element 114, as shown in FIG. 9. In this design, the eyepiece assembly 128 comprises a polarization beam-splitter coating 129, quarterwave plate 131, and focusing mirror 130. Polarized light from the display is passed by the beam-splitter coating 129, through the quarterwave plate 131, to the focusing mirror 130. The reflected light passes again through the quarterwave plate 131, and the light, having passed twice through the properly oriented quarterwave plate, has a polarization which is rotated in a direction orthogonal to the original polarization, and the light is therefore reflected by the coating 129 to the eye, as shown by light ray 135. Light having polarization oriented properly with respect to the beam splitter 129 from the ambient beyond the device, represented by light ray 137, passes through the eyepiece.

Figure 10:
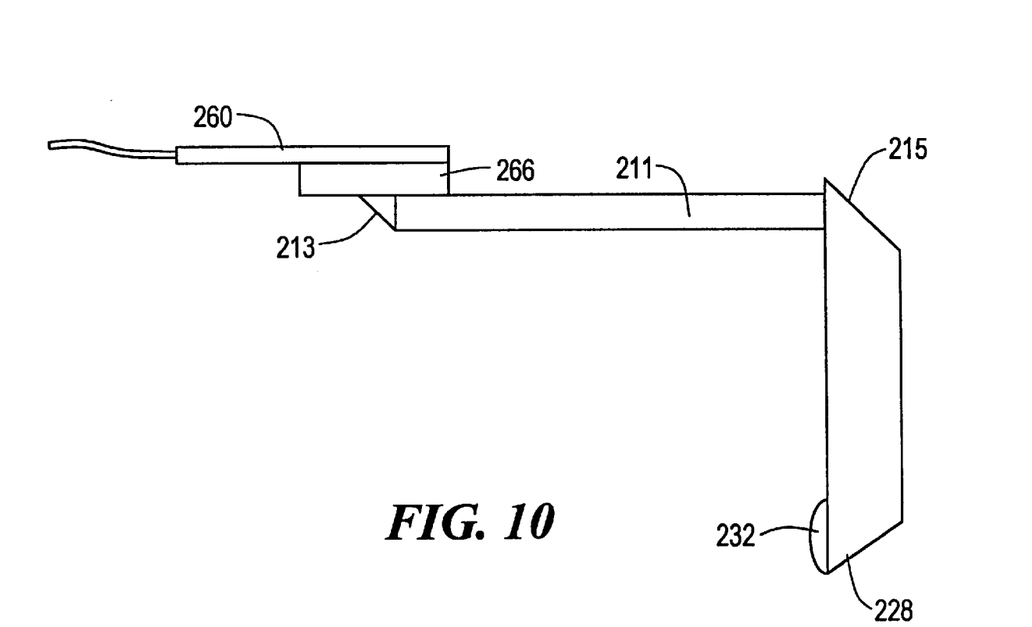
FIG. 10 is a plan view of a further embodiment of the display device using a graded index lens.

Yet another embodiment is shown in FIG. 10. The image is relayed from an image assembly in the housing 226 to the eye lens 232 by an image relay comprising a graded index lens 211 and mirrors 215 and 228. Alternatively, the relay may comprise a coherent fiber bundle or conventional lens relay. Such image relays may be formed from polished glass to reduce the obscuration and to improve peripheral vision. This embodiment further removes obscuring surfaces from the user's face. The device functions in the following way. The image is provided by a display as previously described. The image is placed at the focal plane of the relay 211. For the graded index relay, this is accomplished through a reflection at mirror 213, so that the object image is at the entrance pupil of the relay system. The relay forms an image at its distal end which is relayed to the eyepiece assembly 228 by a mirror 215.

Figure 11:
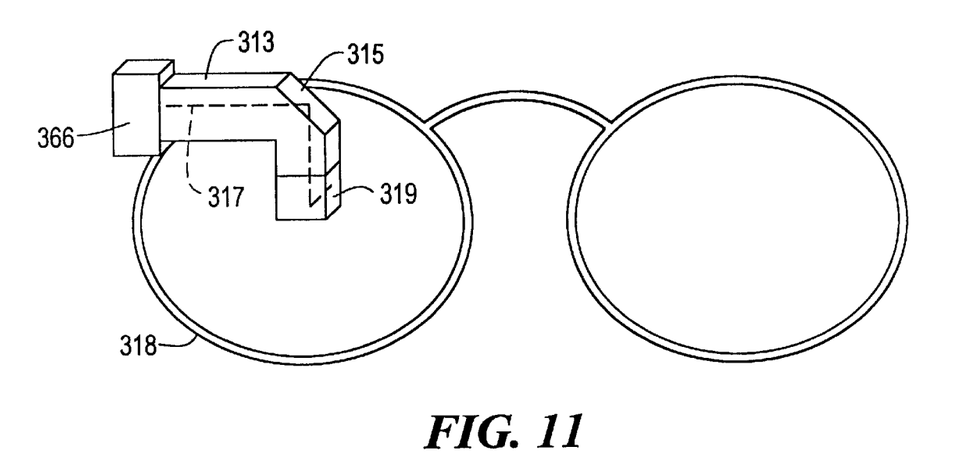
FIG. 11 is a plan view of a still further embodiment of the display device illustrating an alternative optical path and optical element.

FIG. 11 illustrates another embodiment of the remountable display device. In this embodiment, the light is relayed from an imaging assembly in the housing 366 along an optical conduit 313 to a reflective surface 315. The reflective surface may comprise a polished glass surface, in which the reflection occurs by total internal reflection, or it may comprise a metal or other coating intended to reflect the rays from the imaging assembly within the display housing toward the eyepiece assembly 319 along the light path 317. Any number of folds of this type may be incorporated to cause the eyepiece and housing assembly to be placed in convenient, ergonomic, or aesthetic locations. For example, for convenience, the housing assembly may be fixed to the frame 318 in a position in which it is easy to attach or detach the device. Ergonomic considerations include obtaining a degree of balance in the device which can be the result of placing the housing and part of the optical conduit over the frame so that the device's center of gravity resides over the frame. Aesthetic considerations include minimizing the amount of surface area of the device around the user's face.

Figure 12:
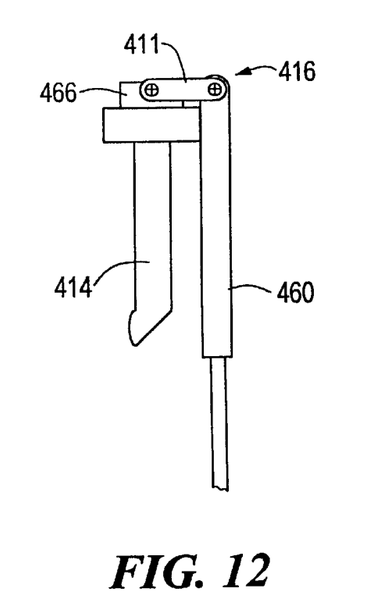
FIG. 12 is a plan view of a further embodiment of the display device using a link element.
Figure 13:
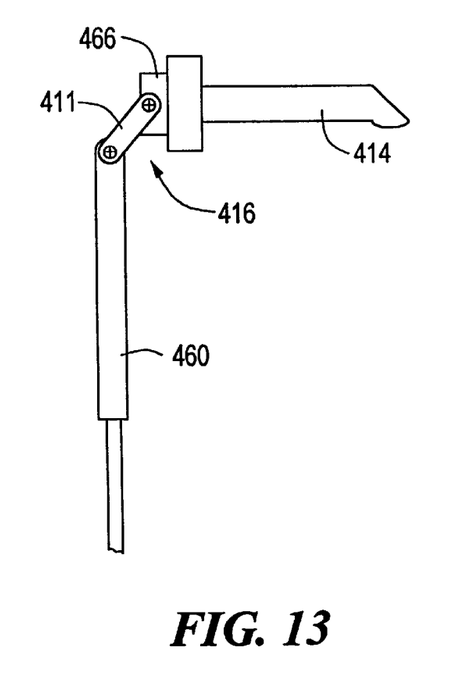
FIG. 13 is a plan view of the display device of FIG. 12.

FIGS. 12 and 13 illustrate a further embodiment of the display device with a link element 411 that connects the imaging assembly and optical element 414 to the housing assembly 416. The housing assembly includes a main body 460 which contains the connections for the cable and the flexible circuits as well as electronic components. A further body 466 supports the imaging assembly. The link element 411 connects the main body 460 and the further body 466 and provides a support for wires connecting the components in the main body with the imaging assembly. The link element allows the optical element to be folded out of view, as shown in FIG. 12, without adjusting the mounting mechanism that attaches the housing to the temple of the user's eyeglasses. The link element also allows some adjustment of the position of the optical element in front of the eyeglass lens.

Figure 14:
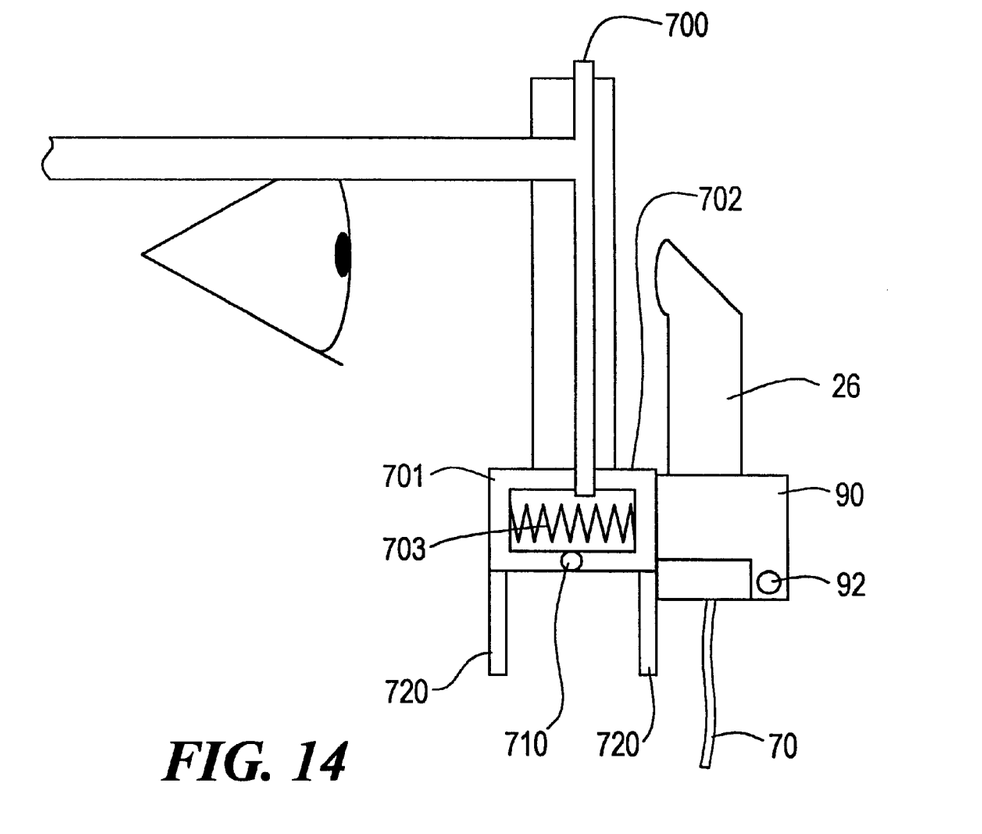
FIG. 14 is a side view of a further embodiment of the display device using a mounting along the outer bottom edge of an eyeglass frame.

FIG. 14 illustrates a method of remountably attaching the device to the eyeglass frame front 700. A clamping apparatus 701 hinged at point 710 and drawn together by spring 703 is affixed to the bottom of the frame front below the lens. The clamp may be shaped in a manner similar to the curvature of the frame to provide increased contact area between the clamp and the frame front. Small handles 720 are provided to apply force against the spring 703 to release the clamp. Affixed to the clamp 701 is the housing 90 of the display device that has been previously described. The optical relay 26 extends into the user's main field of view to provide an image. Any of the foregoing adjustments and pivots may be implemented in order to position the image at a location convenient for viewing.

Alternative embodiments include various forms of eyepiece, illumination optics, and mounting fixtures. Two display devices operated in cooperation, one device in front of each of the two lenses of a pair of eyeglasses, can also be used if desired to provide a binocular display.

The invention is not to be limited by what has been particularly shown and described, except as indicated by the appended claims.

We claim:

1. A compact, remountable display device for eyewear having a head-borne frame, the display device comprising:
    a housing assembly having a mounting mechanism disposed to removably mount to a temple of the head-borne frame of the eyewear;
    circuitry disposed within the housing assembly to receive data or video signals;
    an electronic imaging assembly supported by the housing assembly and in communication with the circuitry within the housing assembly to produce an image; and
    an optical element comprising:
        a transparent fixture for supporting an eyepiece assembly in front of a user's eye, the fixture located to receive the image from the electronic imaging assembly and capable of relaying the image internally; and
        an eyepiece assembly supported by the transparent fixture to direct an image to the user's eye.

2. The device of claim 1, wherein the eyepiece assembly comprises at least one reflecting surface disposed to redirect the image in the transparent fixture toward the user's eye and a lens located before the user's eye.

3. The device of claim 1, wherein the eyepiece assembly comprises a polarization beam-splitter coating, a quarter-wave plate, and a focusing mirror arranged so that polarized light from the imaging assembly passes the beam-splitter coating and the quarterwave plate and is reflected from the focusing mirror to pass in the opposite direction through the quarterwave plate and is reflected from the beam-splitter coating toward the eye.

4. The device of claim 1, wherein the transparent fixture comprises an optical relay defining an optical path therethrough.

5. The device of claim 1, wherein the transparent fixture comprises an optical relay including at least one mirror along the optical path for reflecting light.

6. The device of claim 1, wherein the transparent fixture comprises an optical relay having first and second surfaces disposed to permit transmission of ambient light, the first and second surfaces further being optically parallel.

7. The device of claim 1, wherein the transparent fixture comprises an optical relay, the optical relay being optically clear and having a uniform index of refraction within at least a main field of view of the user.

8. The device of claim 1, further comprising a graded index lens between the imaging assembly and the optical element.

9. The device of claim 1, wherein the graded index lens is disposed along a temple of the head-borne frame.

10. The device of claim 1, wherein the transparent fixture further includes a cover to block ambient light from passing through the transparent fixture to the user's eye.

11. The device of claim 1, wherein the imaging assembly comprises a miniature flat panel display.

12. The device of claim 1, wherein the display has a screen diagonal of less than 2 cm.

13. The device of claim 1, wherein the imaging assembly comprises a transmissive or reflective miniature active matrix liquid crystal display, an electroluminescent display, or a scanning display.

14. The device of claim 1, wherein the housing assembly comprises an elongated body having an open side and at least one cover plate disposed to cover the open side.

15. The device of claim 1, wherein the mounting mechanism comprises a clamping device disposed to clamp the housing assembly to the temple of the head-borne frame.

16. The device of claim 1, wherein the mounting mechanism is configured to adjust the elevation of the optical element with respect to the user's eye.

17. The device of claim 1, wherein the mounting mechanism includes a rotatable mechanism configured to rotatably adjust the optical element with respect to the user's eye.

18. The device of claim 16, wherein the housing assembly is located substantially outside the user's field of view.

19. The device of claim 1, wherein the housing assembly includes a body and a swivel fixture, the imaging assembly supported by the swivel fixture, the swivel fixture pivotably mounted to pivot the imaging assembly and the optical element out of the user's main field of view.

20. The device of claim 1, wherein the housing assembly includes a main body, a further body supporting the imaging assembly and the optical element, and a link element pivotably connecting the main body and the further body, whereby pivoting of the link element moves the optical element out of the user's main field of view.

21. The device of claim 1, wherein the housing assembly includes a collar, and the optical element is movably supported within the collar to provide a focusing adjustment.

22. A compact, remountable display device for eyewear having a head-borne frame, the display device comprising:
    a housing assembly having a mounting mechanism disposed to removably mount to the head-borne frame of the eyewear at a location outside a user's main field of view;
    circuitry disposed within the housing assembly to receive data or video signals;
    an electronic imaging assembly supported by the housing assembly outside of the user's main field of view and in communication with the circuitry within the housing assembly to produce an image; and
    an optical element comprising:
        a transparent fixture for supporting an eyepiece assembly in front of a user's eye, the fixture located to receive the image from the electronic imaging assembly and capable of relaying the image internally; and
        an eyepiece assembly supported by the transparent fixture to direct an image to the user's eye.

23. The device of claim 22, wherein the eyepiece assembly comprises at least one reflecting surface disposed to redirect the image in the transparent fixture toward the user's eye and a lens located before the user's eye.

24. The device of claim 22, wherein the eyepiece assembly comprises a polarization beam-splitter coating, a quarterwave plate, and a focusing mirror arranged so that polarized light from the imaging assembly passes the beam-splitter coating and the quarterwave plate and is reflected from the focusing mirror to pass in the opposite direction through the quarterwave plate and is reflected from the beam-splitter coating toward the eye.

25. The device of claim 22, wherein the transparent fixture comprises an optical relay defining an optical path therethrough.

26. The device of claim 22, wherein the transparent fixture comprises an optical relay having first and second surfaces disposed to permit transmission of ambient light, the first and second surfaces further being optically parallel.

27. The device of claim 22, wherein the transparent fixture comprises an optical relay, the optical relay being optically clear and having a uniform index of refraction within at least a main field of view of the user.

28. The device of claim 22, wherein the transparent fixture comprises an optical relay including at least one mirror along the optical path for reflecting light.

29. The device of claim 22, wherein the imaging assembly comprises a miniature flat panel display.

30. The device of claim 22, wherein the imaging assembly comprises a transmissive or reflective miniature active matrix liquid crystal display, an electroluminescent display, or a scanning display.

31. A compact, remountable display device for eyewear having a head-borne frame, the display device comprising:

a housing assembly having a mounting mechanism disposed to removably mount to the head-borne frame of the eyewear at a location outside a user's main field of view;

circuitry disposed within the housing assembly to receive data or video signals;

an electronic imaging assembly supported by the housing assembly outside of the user's main field of view and in communication with the circuitry within the housing assembly to produce an image; and an optical element comprising:
    a transparent fixture for supporting an eyepiece assembly in front of a user's eye, the fixture located to receive the image from the electronic imaging assembly and capable of relaying the image internally, the transparent fixture having a uniform index of refraction and including first and second optically parallel surfaces disposed to permit transmission of ambient light to the user's eye; and
    an eyepiece assembly supported by the transparent fixture to direct an image to the user's eye.

32. The device of claim 31, wherein the eyepiece assembly comprises at least one reflecting surface disposed to redirect the image in the transparent fixture toward the user's eye and a lens located before the user's eye.

33. The device of claim 31, wherein the eyepiece assembly comprises a polarization beam-splitter coating, a quarterwave plate, and a focusing mirror arranged so that polarized light from the imaging assembly passes the beam-splitter coating and the quarterwave plate and is reflected from the focusing mirror to pass in the opposite direction through the quarterwave plate and is reflected from the beam-splitter coating toward the eye.

34. The device of claim 31, wherein the transparent fixture comprises an optical relay defining an optical path therethrough.

35. The device of claim 31, wherein the transparent fixture comprises an optical relay including at least one mirror along the optical path for reflecting light.

36. The device of claim 31, wherein the imaging assembly comprises a miniature flat panel display.

37. The device of claim 31, wherein the imaging assembly comprises a transmissive or reflective miniature active matrix liquid crystal display, an electroluminescent display, or a scanning display.

* * * * *

UNITED STATES PATENT AND TRADEMARK OFFICE
CERTIFICATE OF CORRECTION

PATENT NO  : 6,023,372
DATED      : February 8, 2000
INVENTOR(S) : Mark B. Spitzer, et al.

It is certified that error appears in the above-identified patent and that said Letters Patent are hereby corrected as shown below:

Column 3, line 56, "450", should read --45°--; and

Column 3, line 57, "200", should read --20°--.

Signed and Sealed this

Fifteenth Day of May, 2001

*Attest:*

NICHOLAS P. GODICI

*Attesting Officer*   *Acting Director of the United States Patent and Trademark Office*